(12) United States Patent
Kim et al.

(10) Patent No.: US 12,213,098 B2
(45) Date of Patent: Jan. 28, 2025

(54) METHOD AND APPARATUS FOR TRANSMITTING USER DATA THROUGH PAGING MESSAGE IN MOBILE COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 497 days.

(21) Appl. No.: 17/309,132

(22) PCT Filed: Oct. 30, 2019

(86) PCT No.: PCT/KR2019/014469
§ 371 (c)(1),
(2) Date: Apr. 28, 2021

(87) PCT Pub. No.: WO2020/091417
PCT Pub. Date: May 7, 2020

(65) Prior Publication Data
US 2022/0015061 A1 Jan. 13, 2022

(30) Foreign Application Priority Data
Oct. 31, 2018 (KR) .................. 10-2018-0132058

(51) Int. Cl.
*H04W 68/00* (2009.01)
*H04W 74/08* (2024.01)
*H04W 74/0833* (2024.01)
*H04W 76/19* (2018.01)

(52) U.S. Cl.
CPC ..... *H04W 68/005* (2013.01); *H04W 74/0833* (2013.01); *H04W 76/19* (2018.02)

(58) Field of Classification Search
CPC . H04W 74/0833; H04W 76/19; H04W 68/00; H04W 68/005; H04W 68/02;
(Continued)

(56) References Cited

U.S. PATENT DOCUMENTS 10,050,825 B2 8/2018 Dwarakanath et al.
2018/0035469 A1* 2/2018 Chen ................ H04W 74/0833
(Continued)

FOREIGN PATENT DOCUMENTS

EP         3806557 A1 * 4/2021 .......... H04W 68/005
KR    10-2018-0090212 A    8/2018

OTHER PUBLICATIONS

International Search Report and Written Opinion of the International Searching Authority dated Feb. 6, 2020 in connection with International Application No. PCT/KR2019/014469, 9 pages.
(Continued)

*Primary Examiner* — Awet Haile

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

8 Claims, 17 Drawing Sheets

(58) Field of Classification Search
CPC ............ H04W 72/0453; H04W 76/27; H04W 88/023; Y02D 30/70
See application file for complete search history.

(56) References Cited

U.S. PATENT DOCUMENTS

| | | | |
|---|---|---|---|
| 2018/0220288 A1 | 8/2018 | Agiwal et al. | |
| 2019/0223221 A1* | 7/2019 | Johansson | H04W 76/27 |
| 2020/0187245 A1* | 6/2020 | Fujishiro | H04W 74/0833 |
| 2021/0345208 A1* | 11/2021 | Rugeland | H04W 36/08 |
| 2022/0039060 A1* | 2/2022 | Chang | H04W 76/27 |
| 2022/0053572 A1* | 2/2022 | Pham Van | H04W 74/0841 |

OTHER PUBLICATIONS

Ericsson, "Mobile terminated early data transmission," R2-1814340, 3GPP TSG RAN WG2 #103bis, Chengdu, P.R. China, Oct. 8-12, 2018, 8 pages.
Huawei et al., "Early DL data transmission," R2-1813914, 3GPP TSG-RAN WG2 Meeting #103bis, Chengdu, P.R. China, Oct. 8-12, 2018, 8 pages.
MediaTek Inc, "Mobile terminated Early Data Transmission," R2-1815372, 3GPP TSG RAN WG2 Meeting #103bis, Chengdu, P.R. China, Oct. 8-12, 2018, 6 pages.
Nokia et al., "Analysis of Downlink EDT options," R2-1814415, 3GPP TSG RAN WG2 Meeting #103bis, Chengdu, P.R. China, Oct. 8-12, 2018, 7 pages.
ZTE, "Consideration for supporting MT EDT in NB-IoT and eMTC," R2-1814925, 3GPP TSG-RAN WG2 Meeting #103bis, Chengdu, P.R. China, Oct. 8-12, 2018, 3 pages.
Office Action dated Oct. 4, 2024, in connection with Korean Application No. 10-2018-0132058, 15 pages.
Ericsson, "[99bis#53][MTC/NB-IOT] EDT indication via Prach," R2-1713057, 3GPP TSG-RAN WG2 #100, Reno, Nevada, Nov. 27-Dec. 1, 2017, 30 pages.
Samsung (rapporteur), "Introducing WIs endorsed for ASN. 1 review of 36.331 REL-15 second drop," R2-1810773, 3GPP TSG WG2 NR AH 1807, Montreal, Canada, Jul. 2-6, 2018, 899 pages.

* cited by examiner

METHOD AND APPARATUS FOR TRANSMITTING USER DATA THROUGH PAGING MESSAGE IN MOBILE COMMUNICATION SYSTEM

CROSS-REFERENCE TO RELATED APPLICATIONS

This application is a 371 National Stage of International Application No. PCT/KR2019/014469, filed Oct. 30, 2019, which claims priority to Korean Patent Application No. 10-2018-0132058, filed Oct. 31, 2018, the disclosures of which are herein incorporated by reference in their entirety.

BACKGROUND

1. Field

The disclosure relates to operation of a user equipment (UE) and an evolved node B (eNB) in a mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

SUMMARY

Therefore, the disclosure has been made in view of the above-mentioned problems, and an aspect of the disclosure is to provide a method and apparatus for transmitting or receiving short data using a paging message, without switching a user equipment (UE) in an idle mode or an inactive mode to a connected mode.

Another aspect of the disclosure is to provide a method and apparatus for transmitting or receiving short data using random access, without switching a UE in an idle mode or an inactive mode to a connected mode.

The technical subjects pursued in the disclosure may not be limited to the above-mentioned technical subjects, and other technical subjects which are not mentioned may be clearly understood, through the following descriptions, by those skilled in the art to which the disclosure pertains.

In accordance with an aspect of the disclosure, a method of a user equipment (UE) in a wireless communication system may include: receiving a paging message from a base station; transmitting a dedicated preamble for downlink early data transmission based on the paging message; receiving a random access response (RAR) based on the dedicated preamble; transmitting msg3 based on the RAR; and receiving msg4 including downlink data based on the msg3.

According to some embodiments, if the UE is in an idle mode, a first radio resource control (RRC) message is included in the msg3, and a second RRC message is included in the msg4, the first RRC message is an RRCEarlyDataRequest message, the second RRC message is an RRCEarlyDataComplete message, and the first RRC message includes establishmentCause indicating mt-data.

According to some embodiments, if the UE is in an inactive mode, a third RRC message is included in the msg3, the third RRC message is an RRCConnectionResumeRequest message, data is multiplexed with the third RRC message, and the third RRC message includes resumeCause indicating mt-data.

According to some embodiments, the method further includes receiving system information including information associated with the dedicated preamble for DL EDT from the base station, and the paging message includes an indicator indicating that the DL EDT is triggered.

In accordance with another aspect of the disclosure, a method of a base station in a wireless communication system may include: transmitting a paging message to a user equipment (UE); receiving a dedicated preamble for downlink early data transmission (DL EDT) based on the paging message; transmitting a random access response (RAR)

based on the dedicated preamble; receiving msg3 based on the RAR; and transmitting msg4 including downlink data based on the msg3.

In accordance with another aspect of the disclosure, a user equipment (UE) may include: a transceiver configured to transmit or receive at least one signal; and a controller coupled to the transceiver, wherein the controller is configured to: receive a paging message from a base station; transmit a dedicated preamble for downlink early data transmission (DL EDT) based on the paging message; receive a random access response (RAR) based on the dedicated preamble; transmit msg3 based on the RAR; and receive msg4 including downlink data based on the msg3.

In accordance with another aspect of the disclosure, a base station may include: a transceiver configured to transmit or receive at least one signal; and a controller coupled to the transceiver, wherein the controller is configured to: transmit a paging message to a user equipment (UE); receive a dedicated preamble for downlink early data transmission (DL EDT) based on the paging message; transmit a random access response (RAR) based on the dedicated preamble; receive msg3 based on the RAR; and transmit msg4 including downlink data based on the msg3.

According to the disclosure, a UE in an idle mode or an inactive mode may transmit or receive short user data, without being switched to a connected mode.

DETAILED DESCRIPTION

In the following description of the disclosure, a detailed description of known functions or configurations incorporated herein will be omitted when it may make the subject matter of the disclosure unnecessarily unclear. Hereinafter, embodiments of the disclosure will be described with reference to the accompanying drawings. The disclosure will be described on the basis of the LTE system, but may be applied to any other mobile communication system such as the NR system which is a next-generation mobile communication system. As an example, "eNB" in LTE as used herein corresponds to "gNB" in NR, and "mobility management entity (MME)" in LTE as used herein corresponds to "access and mobility management function (AMF) in NR.

Figure 1A:
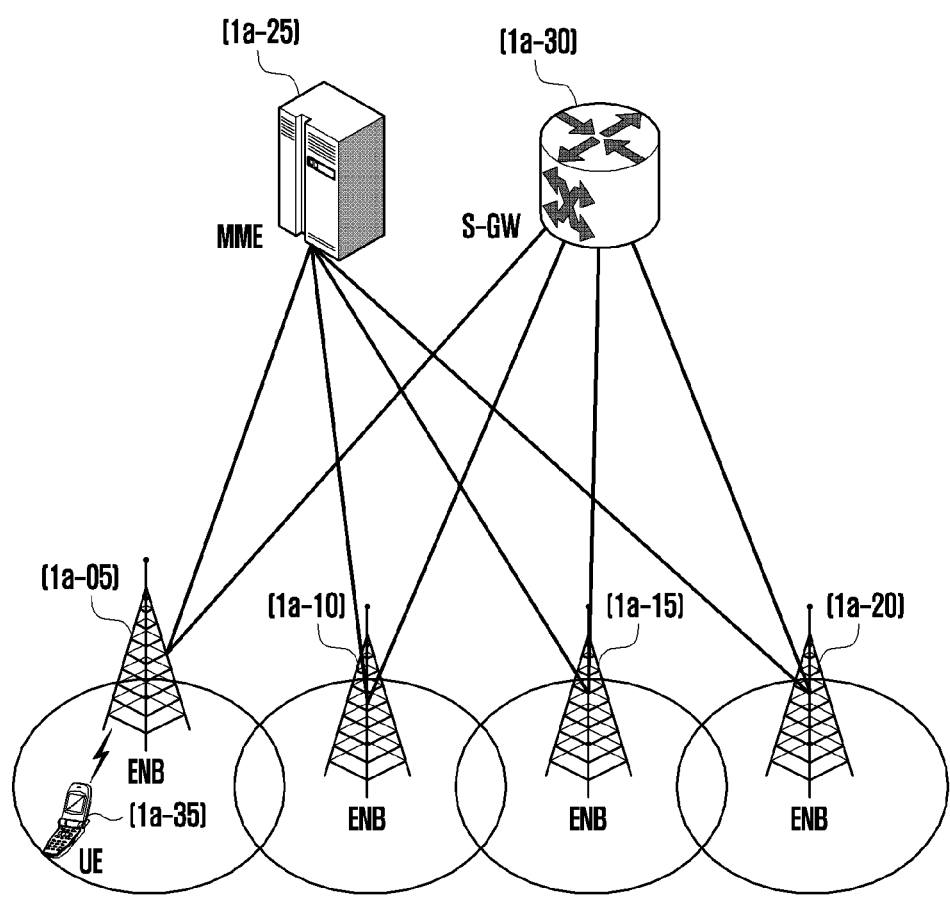
FIG. 1A is a view illustrating the structure of an LTE system to which the disclosure is applied.

FIG. 1A is a diagram illustrating the structure of an LTE system to which the disclosure is applied.

Referring to FIG. 1A, as illustrated in the drawings, a radio access network of an LTE system includes next generation base stations (evolved Node Bs (ENB), Node Bs, or base stations) 1a-05, 1a-10, 1a-15, and 1a-20, a mobility management entity (MME) 1a-25, and a serving-gateway (S-GW) 1a-30. A user equipment (UE) (or a terminal) 1a-35 accesses an external network via the ENB 1a-05 to 1a-20 and the S-GW 1a-30.

In FIG. 1A, the ENB 1a-05 to 1a-20 corresponds to a legacy node B in a UMTS system. The ENB is connected to the UE 1a-35 via a wireless channel, and performs a more complicated role than the legacy node B. In the LTE system, real-time services, such as a voice over IP (VoIP) via an Internet protocol, and all user traffic are provided via a shared channel. Accordingly, there is a desire for a device that performs scheduling by collecting state information of UEs, such as a buffer state, an available transmission power state, a channel state, and the like, and the ENB 1a-05 to 1a-20 may be in charge of it.

One ENB generally controls a plurality of cells. For example, in order to implement a transmission rate of 100 Mbps, the LTE system uses an orthogonal frequency division multiplexing (OFDM) in a bandwidth of 20 MHz, as a radio access technology. In addition, an adaptive modulation & coding (AMC) scheme that determines a modulation scheme and a channel coding rate based on the channel state of a UE may be applied. The S-GW 1a-30 is a device for providing a data bearer, and produces or removes a data bearer according to control by the MME 1a-25. The MME is a device that is in charge of various control functions in addition to a mobility management function associated with a UE, and may be connected to a plurality of eNBs.

Figure 1B:
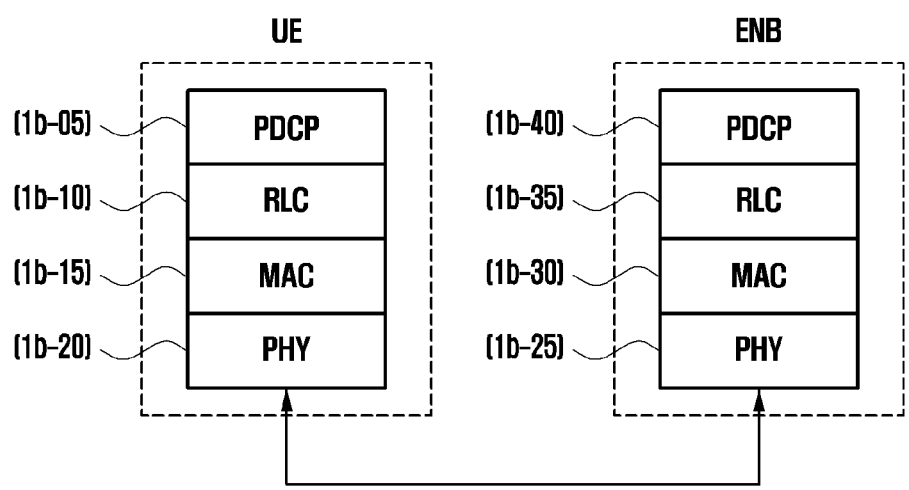
FIG. 1B is a view illustrating the structure of a wireless protocol in an LTE system to which the disclosure is applied.

FIG. 1B is a view illustrating the structure of a wireless protocol in an LTE system to which the disclosure is applied.

Referring to FIG. 1B, the radio protocol of the LTE system may include a packet data convergence protocol (PDCP) 1b-05 and 1b-40, a radio link control (RLC) 1b-10 and 1b-35, and a medium access control (MAC) 1b-15 and 1b-30 respectively for a UE and an ENB.

The PDCP 1b-05 and 1b-40 is in charge of an IP header compression/decompression operation or the like, and the radio link control (RLC) 1b-10 and 1b-35 reconfigures a PDCP packet data unit (PDU) to have an appropriate size, and performs an ARQ operation.

The MAC 1b-15 and 1b-30 is connected to various RLC layer devices configured for one UE, and multiplexes RLC PDUs to a MAC PDU and demultiplexes RLC PDUs from a MAC PDU.

The PHY layer 1b-20 and 1b-25 performs an operation of channel-coding and modulating higher layer data to produce an OFDM symbol and transmitting the OFDM symbol via a wireless channel, or demodulating and channel-decoding an OFDM symbol received via a wireless channel and transmitting the demodulated and channel-decoded OFDM symbol to a higher layer.

The disclosure provides a technology in which a user equipment (UE) in an idle mode (RRC Idle) or an inactive mode (RRC inactive) transmits or receives predetermined short user data during a process of performing random access or paging with a base station, without being changed to a connected mode (RRC Connected) in a mobile communication system. In the disclosure, the technology is referred to as an early data transmission (EDT). Particularly, the disclosure provides a method in which a base station transmits mobile terminated-initiated (MT-initiated) user data to a UE using the EDT technology.

In the disclosure, the downlink transmission is referred to as downlink early data transmission (DL EDT). There may be many options for the DL EDT depending on whether the user data is transmitted via a paging message, a random access response (RAR), or msg4.

Figure 1C:
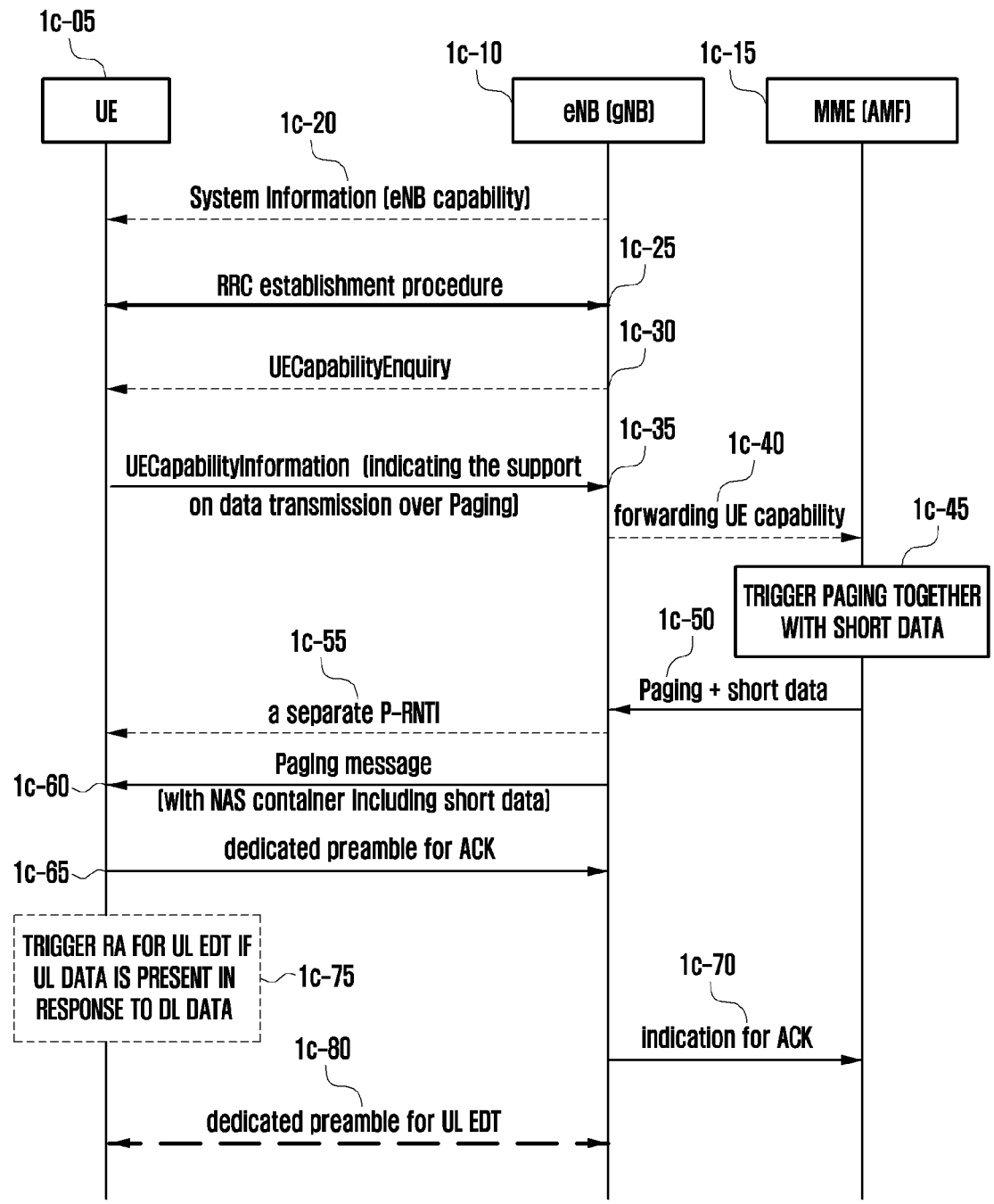
FIG. 1C is a flowchart illustrating a process of transmitting user data using a paging message according to the disclosure.

FIG. 1C is a flowchart illustrating a process of transmitting user data using a paging message according to the disclosure.

Wireless devices belonging to machine type communication (MTC) or Internet of Things (IoT) may need to perform transmission or reception of significantly short user data therebetween. For example, some bits of data needed to turn on or off some functions of the wireless device may need to be transmitted or received. The size of a paging message is very limited. However, the paging message may have no great difficulty in transmitting the some bits of data, and the transmission via the paging message may reduce the amount of time needed for transmitting or receiving user data.

A UE 1c-50 may identify whether a base station 1c-10 supports EDT, via system information broadcasted by the base station 1c-10 in operation 1c-20. The base station may configure, in the system information, information indicating whether DL EDT is supported or whether DL EDT using a paging message is supported. In addition, the base station may provide dedicated preambles for DL EDT that uses a paging message, via system information.

The UE may be switched to a connected mode via a connection process with the base station in operation 1c-25. The base station may request UE capability information from the UE using a predetermined RRC message in operation 1c-30. The UE may report the UE capability information to the base station in operation 1c-35, and the UE capability information may include an indicator indicating whether the UE supports DL EDT that uses a paging message. The base station that obtains the UE capability information may transmit the information to an MME in operation 1c-40.

The MME triggers paging in order to transmit, to the UE, short user data which is capable of being accommodated in a paging message in operation 1c-45. The MME may determine whether the UE supports the paging message-based DL EDT and may determine whether the user data is capable of being accommodated in the paging message. The amount of user data that the paging message is capable of accommodating may be reported in advance from the base station or may be predetermined as a fixed value. If the two conditions are satisfied, the MME may transmit the short user data together, when transmitting paging to the base station in operation 1c-50. In addition, the MME may indicate that the user data is transmitted via the paging message.

The base station that receives the paging and the user data may transmit control information to which a separate radio network temporary identifier (RNTI) is applied, to the UE via a physical downlink control channel (PDCCH), wherein the RNTI indicates that the paging message includes the user data, in operation 1c-55. Alternatively, control information to which an existing P-RNTI is applied may be transmitted to the UE via a PDCCH. In addition, the paging message including the user data may be transmitted to the UE in operation 1c-60.

The UE may receive the paging message according to scheduling information provided from the PDCCH to which the RNTI is applied. The paging message may include a list of paging records, and a paging record may include a UE ID and a non-access-stratum (NAS) container that accommodates the user data. The reason to include the user data in the NAS container is to apply NAS security. A paging message is a message transmitted without configuration of access-stratum (AS) security, and thus, if the paging message is transmitted to a dedicated traffic channel (DTCH), the paging message transmission may be vulnerable in security.

If the user data is successfully received, the UE may transmit acknowledgement to the base station. In the disclosure, for the purpose of acknowledgement (ack), a separate dedicated preamble is transmitted in operation 1c-65, or ack information may be accommodated in msg3 and may be transmitted.

In the method of transmitting a dedicated preamble for the purpose of ack, the base station may indicate a single dedicated preamble used for ack in the paging record of the paging message. The dedicated preamble may be one selected from among dedicated preambles for EDT provided from the system information that the base station broadcasts.

In the method of transmitting ack information by including the same in msg3, the UE may select one of dedicated preambles for EDT provided from the system information broadcasted from the base station, and may transmit the selected dedicated preamble to the base station. In response thereto, the base station may transmit an RAR to the UE. The RAR may include scheduling information needed for transmitting msg3, and the UE may transmit msg3 to the base station using the information. The msg3 may include ack information associated with reception of the user data of the paging message. The ack information may be included in the NAS container of the predetermined RRC message accommodated in the msg3, or may be included in a medium access control (MAC) control element (CE) or a DTCH transmitted in the msg3. If the ack information is included in the NAS container, NAS security may be applied.

The ack information that the base station receives may be forwarded to the MME in operation 1c-70.

If the UE needs to transmit data in response to the user data received via the DL EDT, and the size of the response data is not greater than a predetermined size, the UE may trigger uplink (UL) EDT in operation 1c-75. That is, the UE may include the response data in a predetermined RRC message of msg3 or a DTCH, and may transmit the same in a random access process in operation 1c-80. If the predetermined RRC message of the msg3 is used, the response data may be accommodated in the NAS container of the message. If the size of the response data is not transmittable via UL EDT, an establishment process may be initialized.

Figure 1D:
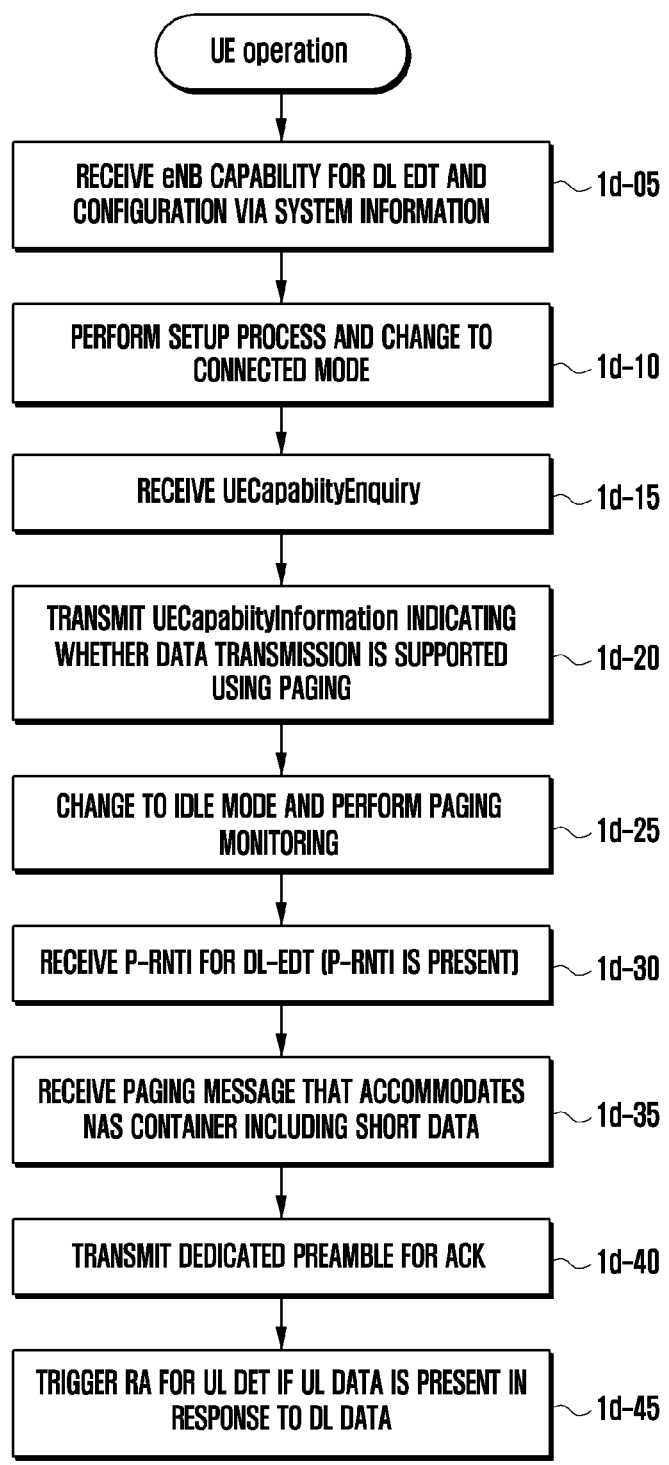
FIG. 1D is a flowchart illustrating operation of a user equipment (UE) according to the disclosure.

FIG. 1D is a flowchart illustrating operation of a UE according to the disclosure.

In operation 1d-05, the UE may receive a base station capability information associated with whether DL EDT is supported, via system information broadcasted from an base station.

In operation 1d-10, the UE may be switched to a connected mode via a setup process.

In operation 1d-15, the UE may receive a request for reporting UE capability information from the base station.

In operation 1d-20, the UE may report, to the base station, UE capability information including an indicator indicating whether the UE supports DL EDT that uses a paging message.

In operation 1d-25, the UE may be switched to an idle mode, and may monitor paging.

In operation 1d-30, the UE may receive a predetermined P-RNTI from the base station. If the UE receives the RNTI, the UE may recognize that user data is included in a paging message, and may prepare decoding of the same. An existing P-RNTI may be used. In this instance, the UE may not recognize at the moment that a paging message including user data is to be transmitted. At the stage, the UE may not be capable of identifying whether user data is included in its paging record in the paging message.

In operation 1d-35, the UE may receive a paging message that accommodates a NAS container including the user data from the base station. The UE may identify that a NAS container is included in a paging record corresponding to the UE in the paging message, and may successfully decode the user data from the NAS container. The UE may identify a UE id included in a paging record, and may identify a paging record corresponding to the UE.

In operation 1d-40, the UE may transmit, to the base station, a separate dedicated preamble for acknowledgement (ack) associated with reception of the user data, or may transmit ack information by including the same in msg3.

In operation 1d-45, if the UE needs to transmit data in response to the user data received via the DL EDT, and the size of the response data is not greater than a predetermined size, the UE may trigger uplink (UL) EDT.

Figure 1E:
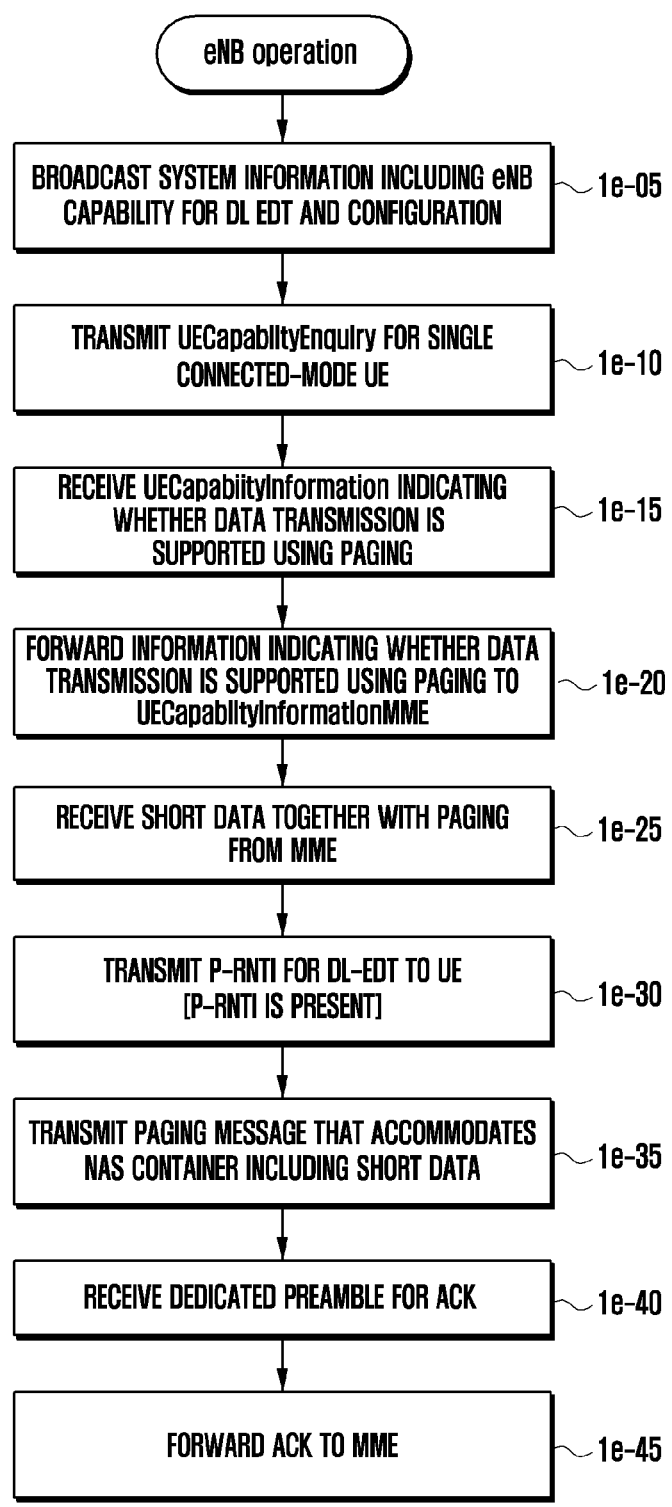
FIG. 1E is a flowchart illustrating operation of a base station according to the disclosure.

FIG. 1E is a flowchart illustrating operation of a base station according to the disclosure.

In operation 1e-05, the base station may broadcast base station capability information associated with whether DL EDT is supported, via system information.

In operation 1e-10, if the base station does not have capability information associated with a single connected-mode UE, the base station may request the UE to report UE capability information.

In operation 1e-15, the base station may receive, from the UE, UE capability information including an indicator indicating whether the UE supports DL EDT that uses a paging message.

In operation 1e-20, the base station may transmit the UE capability information to an MME.

In operation 1e-25, the base station may receive short user data together with a paging from the MME. In addition, it is indicated that the user data is transmitted via a paging message. Alternatively, depending on the size of the user data, the base station may determine whether to transmit the user data via a paging message.

In operation 1e-30, the base station may transmit a predetermined P-RNTI to the UE.

In operation 1e-35, the base station may transmit a paging message that accommodates a NAS container including the user data to the UE.

In operation 1e-40, the base station may receive a report of ack information associated with reception of the data from the UE via a dedicated preamble or msg3.

In operation 1e-45, the base station may forward the ack information to the MME.

Figure 1F:
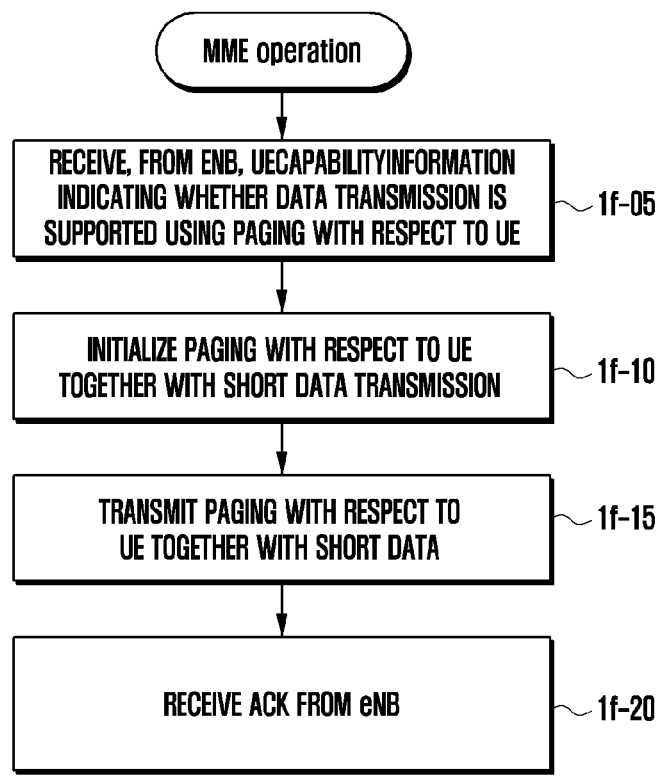
FIG. 1F is a flowchart illustrating operation of an MME according to the disclosure.

FIG. 1F is a flowchart illustrating operation of an MME according to the disclosure.

In operation 1f-05, the MME may receive, from a base station, a report of UE capability information including an indicator indicating whether a predetermined UE supports DL EDT that uses a paging message.

In operation 1f-10, the MME may initialize paging in order to transmit short user data.

In operation 1f-15, the MME may transmit the user data together with the paging to a base station that the UE is camping on.

In operation 1f-20, the MME may receive, from the base station, ack information associated with reception of the data. If it is regarded that the data is not successfully received based on the information, the MME may initialize paging again. In this instance, a method of including user data in a paging message may be triggered again, or a normal data transmission process may be triggered.

Figure 1G:
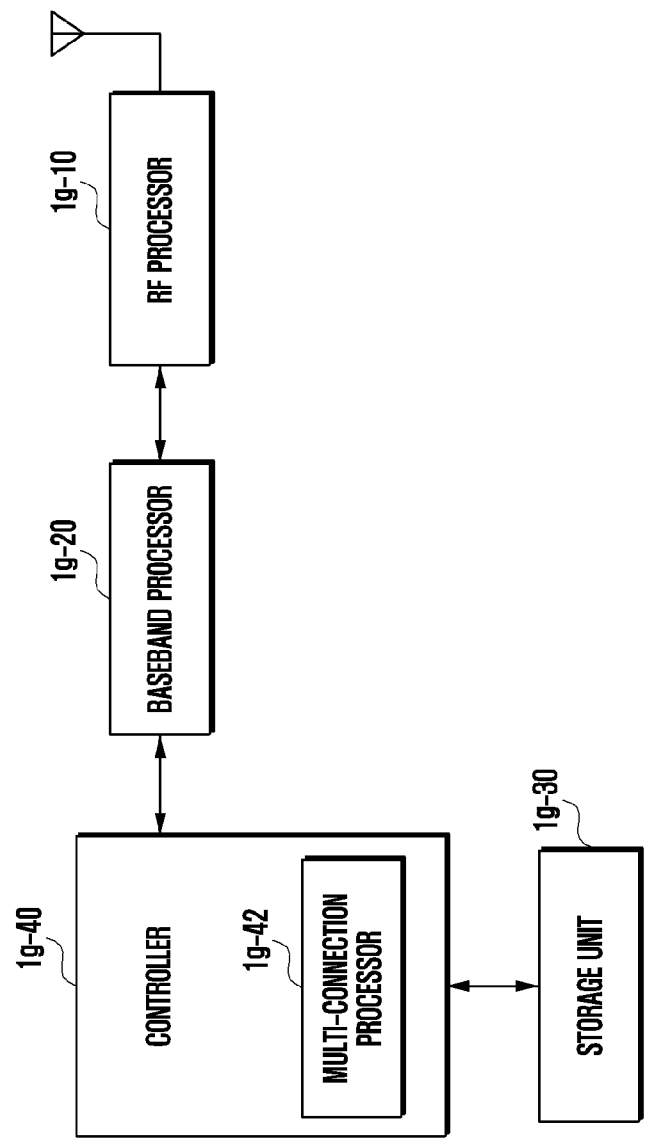
FIG. 1G is a block diagram illustrating the internal structure of a user equipment (UE) according to the disclosure.

FIG. 1G is a block diagram illustrating the internal structure of a UE according to the disclosure.

Referring to the drawing, the UE includes a radio frequency (RF) processor 1g-10, a baseband processor 1g-20, a storage unit 1g-30, and a controller 1g-40.

The RF processor 1g-10 performs a function for transmitting or receiving a signal via a wireless channel, such as band conversion and amplification of a signal. That is, the RF processor 1g-10 up-converts a baseband signal provided from the baseband processor 1g-20 into an RF band signal so as to transmit the RF band signal via an antenna, and down-converts an RF band signal received via the antenna into a baseband signal. For example, the RF processor 1g-10 may include a transmission filter, a reception filter, an amplifier, a mixer, an oscillator, a digital-to-analog converter (DAC), an analog-to-digital converter (ADC), and the like.

Although only a single antenna is illustrated in the drawing, the UE may include a plurality of antennas. In addition, the RF processor 1g-10 may include a plurality of RF chains. Moreover, the RF processor 1g-10 may perform beamforming. For the beamforming, the RF processor 1g-10 may control the phase and the size of each of the signals transmitted or received via a plurality of antennas or antenna elements. In addition, the RF processor may perform MIMO, and may receive multiple layers when performing a MIMO operation.

The baseband processor 1g-20 executes a function of conversion between a baseband signal and a bitstream, according to the physical layer standard of a system. For example, in the case of data transmission, the baseband processor 1g-20 encodes and modulates a transmission bitstream, so as to produce complex symbols. In addition, in the case of data reception, the baseband processor 1g-20, restores a reception bitstream by demodulating and decoding a baseband signal provided from the RF processor 1g-10. For example, according to an orthogonal frequency division multiplexing (OFDM) scheme, in the case of data transmission, the baseband processor 1g-20 produces complex symbols by encoding and modulating a transmission bitstream, maps the complex symbols to subcarriers, and then configures OFDM symbols via an inverse fast Fourier transform (IFFT) operation and cyclic prefix (CP) insertion. In addition, in the case of data reception, the baseband processor 1g-20 divides the baseband signal provided from the RF processor 1g-10 in units of OFDM symbols, reconstructs the signals mapped to the subcarriers via a fast Fourier transform (FFT) operation, and then reconstructs a reception bitstream via demodulation and decoding.

The baseband processor 1g-20 and the RF processor 1g-10 may transmit or receive signals as described above. Accordingly, the baseband processor 1g-20 and the RF processor 1g-10 may be referred to as a transmitter, a receiver, a transceiver, or a communication unit. Furthermore, at least one of the baseband processor 1g-20 and the RF processor 1g-10 may include a plurality of communication modules in order to support different multiple radio access technologies. In addition, at least one of the baseband processor 1g-20 and the RF processor 1g-10 may include different communication modules to process signals of different frequency bands. For example, the different radio access technologies may include a wireless LAN (e.g., IEEE 802.11), a cellular network (e.g., LTE), and the like. Further, the different frequency bands may include a super high frequency (SHF) (e.g., 2.NRHz, NRhz) band and a millimeter (mm) wave (e.g., 60 GHz) band.

The storage unit 1g-30 may store data such as a basic program, an application program, configuration information, and the like for the operation of the UE. Particularly, the storage unit 1g-30 may store information related to a second access node that performs wireless communication using a second radio access technology. In addition, the storage unit 1g-30 may provide data stored therein at the request of the controller 1g-40.

The controller 1g-40 may control overall operation of the UE. For example, the controller 1g-40 may perform transmission or reception of a signal via the baseband processor 1g-20 and the RF processor 1g-10. In addition, the controller 1g-40 may record data in the storage unit 1g-40 and read the data. To this end, the controller 1g-40 may include at least one processor. For example, the controller 1g-40 may include a communication processor (CP) that performs control for communication, and an application processor (AP) that controls an upper layer such as an application program.

Figure 1H:
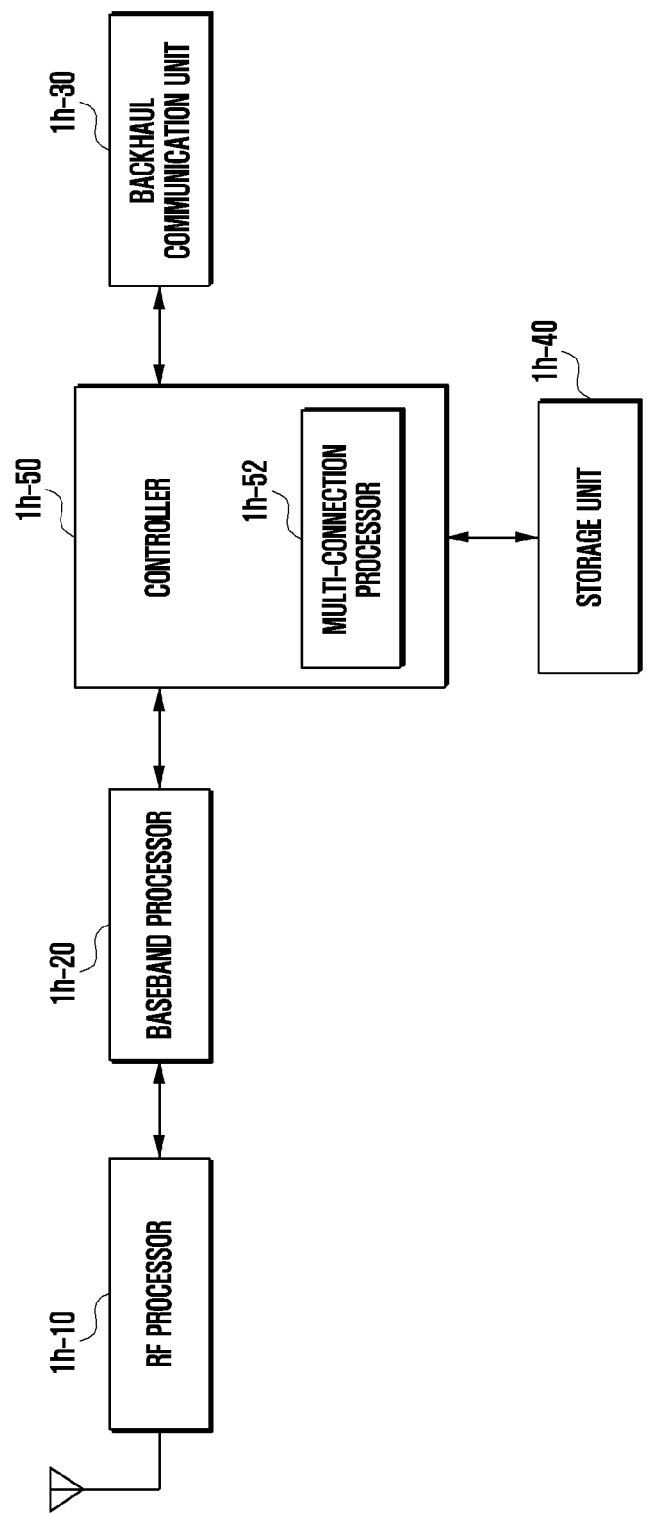
FIG. 1H is a block diagram illustrating the configuration of a base station according to the disclosure.

FIG. 1H is a block diagram of a master base station in a wireless communication system according to an embodiment of the disclosure.

As illustrated in the drawing, the base station may include an RF processor 1h-10, a baseband processor 1h-20, a backhaul communication unit 1h-30, a storage 1h-40, and a controller 1h-50.

The RF processor 1h-10 may perform a function for transmitting or receiving a signal via a wireless channel, such as band conversion and amplification of a signal. That is, the RF processor 1h-10 up-converts a baseband signal provided from the baseband processor 1h-20 into an RF band signal, transmits the RF band signal via an antenna, and down-converts an RF band signal received via the antenna into a baseband signal. For example, the RF processor 1h-10 may include a transmission filter, a reception filter, an amplifier, a mixer, an oscillator, a DAC, an ADC, and the like. Although only a single antenna is illustrated in the drawing, first access node may include a plurality of antennas. In addition, the RF processor 1h-10 may include a plurality of RF chains. Moreover, the RF processor 1h-10 may perform beamforming. For the beamforming, the RF processor 1h-10 may control the phase and the size of each of the signals transmitted or received via a plurality of antennas or antenna elements. The RF processor may perform a downlink MIMO operation by transmitting one or more layers.

The baseband processor 1h-20 may perform a function of conversion between a baseband signal and a bitstream according to the physical layer standard of a first radio access technology. For example, in the case of data transmission, the baseband processor 1h-20 may encode and modulate a transmission bitstream, so as to produce complex symbols. In addition, in the case of data reception, the baseband processor 1h-20 may restore a reception bitstream by demodulating and decoding a baseband signal provided from the RF processor 1h-10. For example, according to the OFDM scheme, in the case of data transmission, the baseband processor 1h-20 may produce complex symbols by encoding and modulating a transmission bitstream, may map the complex symbols onto subcarriers, and then may configure OFDM symbols via an IFFT operation and CP insertion. Further, in the case of data reception, the baseband processor 1h-20 may divide a baseband signal provided from the RF processor 1h-10 in units of OFDM symbols, may reconstruct the signals mapped to the subcarriers via a FFT operation, and then may reconstruct a reception bitstream via demodulation and decoding. The baseband processor 1h-20 and the RF processor 1h-10 may transmit or receive signals as described above. Accordingly, the baseband processor 1h-20 and the RF processor 1h-10 may be referred to as a transmitter, a receiver, a transceiver, a communication unit, or a wireless communication unit.

The backhaul communication unit 1h-30 may provide an interface for performing communication with other nodes in a network. That is, the backhaul communication unit 1h-30 may convert, into a physical signal, a bitstream transmitted from the master base station to another node, for example, a secondary base station, a core network, and the like, and may convert a physical signal received from the other node into a bitstream.

The storage unit 1h-40 may store data such as a basic program, an application program, and configuration information for operation of the master base station. Particularly, the storage unit 1h-40 may store information associated with a bearer allocated to a connected UE, a measurement result reported from a connected UE, and the like. In addition, the storage unit 1h-40 may store information which is a criterion for determining whether to provide or suspend multiple connections to a UE. In addition, the storage unit 1h-40 may provide data stored therein at the request of the controller 1h-50.

The controller 1h-50 may control overall operation of the master base station. For example, the controller 1h-50 may transmit or receive a signal via the baseband processor 1h-20 and the RF processor 1h-10, or via the backhaul communication unit 1h-30. In addition, the controller 1h-50 may record data in the storage unit 1h-40 and may read the data. To this end, the controller 1h-50 may include at least one processor.

Figure 2A:
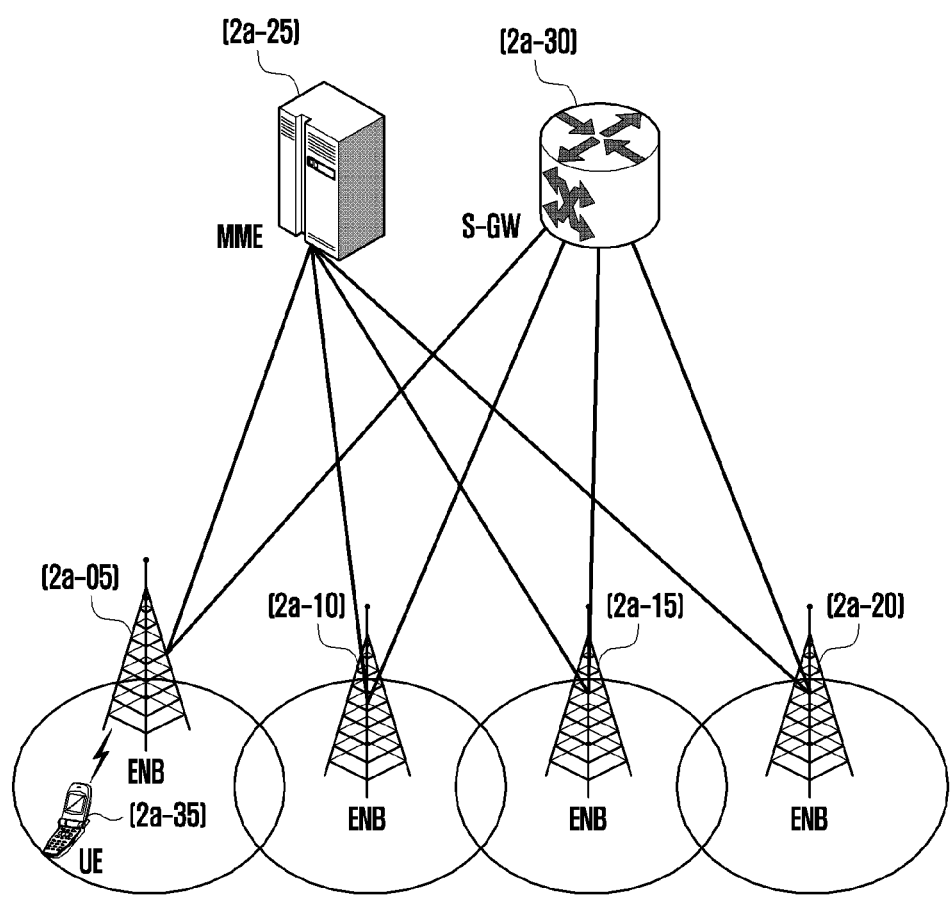
FIG. 2A is a view illustrating the structure of an LTE system to which the disclosure is applied.

FIG. 2A is a view illustrating the structure of an LTE system to which the disclosure is applied.

Referring to FIG. 2A, as illustrated in the drawing, a radio access network of the LTE system may include next generation base stations (ENBs) 2a-05, 2a-10, 2a-15, and 2a-20, an MME 2a-25, and an S-GW 2a-30. A user equipment (UE) 2a-35 accesses an external network via the ENB 2a-05 to 2a-20 and the S-GW 2a-30.

In FIG. 2A, the ENB 2a-05 to 2a-20 corresponds to a legacy node B in a UMTS system. The ENB 2a-05 to 2a-20 is connected to the UE 2a-35 via a wireless channel, and performs a more complicated role than the legacy node B. In the LTE system, real-time services, such as a voice over IP (VoIP) via an Internet protocol, and all user traffic are provided via a shared channel. Accordingly, there is a desire for a device that performs scheduling by collecting state information of UEs, such as a buffer state, an available transmission power state, a channel state, and the like, and the ENBs 2a-05 to 2a-20 may be in charge of it.

One ENB generally controls a plurality of cells. For example, in order to implement a transmission rate of 100 Mbps, the LTE system uses an orthogonal frequency division multiplexing (OFDM) in a bandwidth of 20 MHz, as a radio access technology. In addition, an adaptive modulation & coding (AMC) scheme that determines a modulation scheme and a channel coding rate based on the channel state of a UE may be applied. The S-GW 2a-30 is a device for providing a data bearer, and produces or removes a data bearer according to the control by the MME 2a-25. The MME is a device that is in charge of various control functions in addition to a mobility management function associated with a UE, and may be connected to a plurality of ENB s.

Figure 2B:
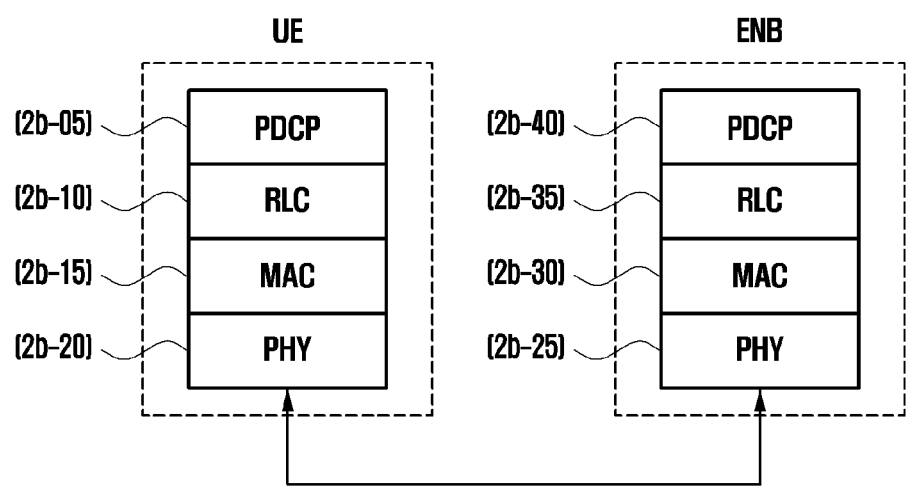
FIG. 2B is a view illustrating the structure of a wireless protocol in an LTE system to which the disclosure is applied.

FIG. 2B is a view illustrating the structure of a wireless protocol in an LTE system to which the disclosure is applied.

Referring to FIG. 2B, the radio protocol of the LTE system may include a PDCP 2b-05 and 2b-40, an RLC 2b-10 and 2b-35, and a MAC 2b-15 and 2b-30 respectively for a UE and an ENB.

The PDCP 2b-05 and 2b-40 is in charge of an IP header compression/decompression operation or the like, and the RLC 2b-10 and 2b-35 reconfigures a PDCP PDU to have an appropriate size, and performs an ARQ operation or the like.

The MAC 2b-15 and 2b-30 is connected to various RLC layer devices configured for one UE, and multiplexes RLC PDUs to a MAC PDU and demultiplexes RLC PDUs from a MAC PDU.

The PHY layer 2b-20 and 2b-25 performs an operation of channel-coding and modulating higher layer data to produce an OFDM symbol and transmitting the OFDM symbol via a wireless channel, or demodulating and channel-decoding an OFDM symbol received via a wireless channel and transmitting the demodulated and channel-decoded OFDM symbol to the higher layer.

The disclosure provides a technology in which a UE in an idle mode (RRC Idle) or an inactive mode (RRC Inactive) transmits or receives predetermined short user data in a random access process performed with a base station, without being switched to a connected mode (RRC Connected) in a mobile communication system. In the disclosure, the technology is referred to as EDT. Particularly, the disclosure provides a method in which a base station transmits MT-initiated user data to a UE using the EDT technology. In the disclosure, the downlink transmission is referred to as downlink early data transmission (DL EDT). There may be many options for the DL EDT depending on whether the user data is transmitted via a paging message, an RAR, or msg4.

Figure 2C:
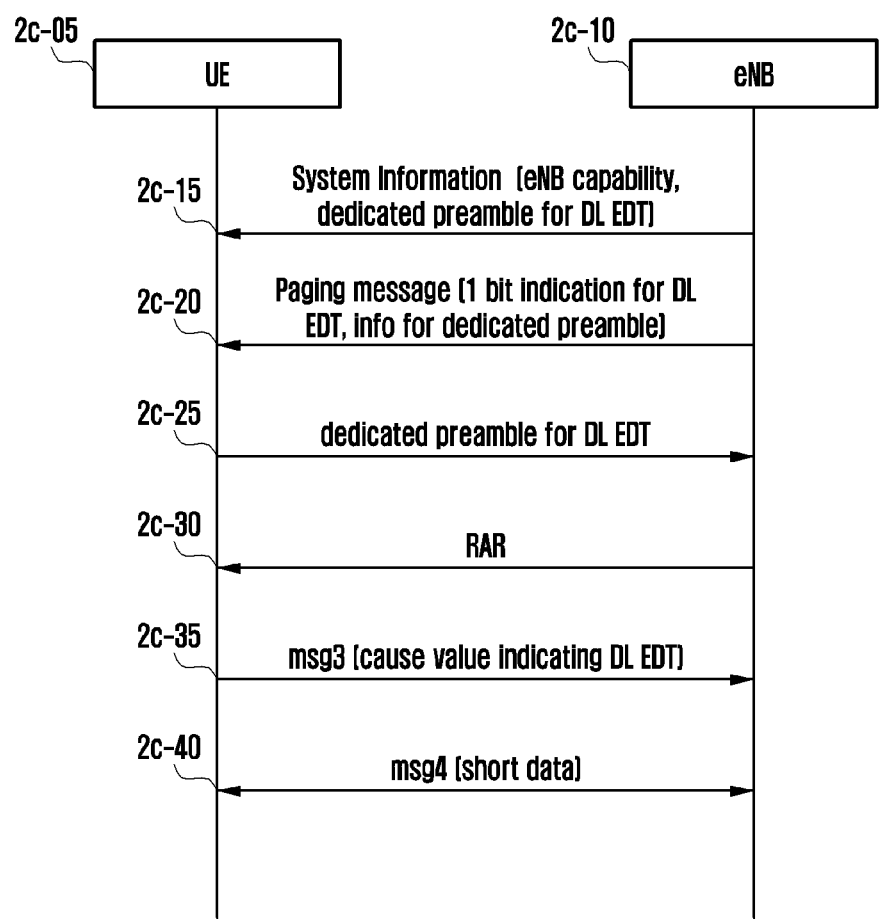
FIG. 2C is a flowchart illustrating a process of transmitting user data using an msg4 message in a random access process according to the disclosure.

FIG. 2C is a flowchart illustrating a process of transmitting user data using an msg4 message in a random access process according to the disclosure.

The method of transmitting MT-initiated user data by including the same in an msg4 message which is the last message in the random access process may provide a few advantages. For example, longer user data may be transmitted when compared to an RAR. In addition, user plane (UP) EDT, in addition to control plane (CP) EDT, may be applied.

In the case of user plane EDT, AS security is required. An AS security mechanism in a resume process that requires a random access process up to msg4 may be reused. A HARQ operation is applied to msg4 in the end, and thus, whether the user data is successfully transmitted may be identified.

A UE 2c-05 may identify whether a base station 2c-10 supports EDT, via system information broadcasted by the base station in operation 2c-15. The base station may configure, in the system information, information indicating whether DL EDT is supported or whether DL EDT using msg4 is supported. In addition, the base station may provide dedicated preambles used for msg4-based DL EDT via system information.

If user data that the base station desires to transmit is within a predetermined size, the base station may trigger msg4-based DL EDT. The base station may include predetermined information in a paging message in order to transmit user data to a single UE via msg4 in operation 2c-20. The predetermined information may be an indicator indicating that msg4-based DL EDT is triggered or dedicated preamble information that the UE needs to use in order to perform random access for the DL EDT. A single paging message may accommodate paging information for a plurality of UEs. A paging for a single UE may correspond to a paging record IE in the message. The paging record IE includes at least a UE ID. Pagings for respective UEs accommodated in a single paging message may include pagings related to msg4-based DL EDT and pagings that are not related thereto. Therefore, the indicator may be included in each paging record IE related to msg4-based DL EDT among paging record IEs included in the paging message. As another example, a separate paging message including only paging record IEs related to msg4-based DL EDT may be transmitted. In order to distinguish a paging message for EDT and a normal paging message, a new P-RNTI may be separately defined in addition to an existing P-RNTI. If the new P-RNTI is not defined, a dedicated paging message for EDT may include an indicator indicating the same. The paging message may be transmitted in a paging frame (PF) of the UE and at a paging occasion (PO) timing. A PF is a frame in which a paging is transmitted, and a PO is defined based on a subframe or a predetermined timeslot (e.g., an OFDMA symbol or the like) in which a paging is transmitted. A PF and a PO may be determined for each UE based on a UE_ID.

A paging record IE related to the msg4-based DL EDT may include dedicated preamble information that a UE corresponding to the paging record uses. The dedicated preamble information may be a preamble ID or a mask index value. The mask index value may be included in a paging message, or a corresponding mask index value for each preamble may be provided via system information. If the mask index value is not included, one of the dedicated preambles for EDT which are broadcasted via system information may be selected and transmitted in operation 2c-25. The dedicated preambles for EDT which are broadcasted via the system information may be used by accurately classifying them as preambles for mobile originated-initiated (MO-initiated) EDT or preambles for MT-initiated EDT, or may be used if the preambles are for EDT without classifying them as preambles for MO-initiated EDT or preambles for MT-initiated EDT. If the preambles are classified for use, preamble collision may be minimized at least in the case of DL EDT, and the amount of time spent on performing DL EDT may be minimized.

The base station may transmit an RAR in response to the preamble in operation 2c-30.

The UE may transmit msg3 to the base station in operation 2c-35. In this instance, there may be a control plane (CP) EDT method and a user plane (UP) EDT method. In the case of the CP EDT, a predetermined RRC message may be included in the msg3, and the RRC message may be an RRCEarlyDataRequest message. The RRC message may include an establishmentCause field, and may indicate mo-data, delayTolerantAccess, and mt-data. In the case of the msg4-based DL EDT, the UE may set the field value to mt-data. In addition, an S-temporary mobile subscriber identity (S-TMSI) of the UE may be included in the message.

In the case of the UP EDT, a predetermined RRC message may be included in the msg3. The RRC message may be an RRCConnectionResumeRequest message. In the RRC message, resumeID, resumeCause, and shortResumeMAC-I may be included. In the case of the msg4-based DL EDT, resumeCause may be set to mt-data which is a new cause value.

Which one of the CP EDT or UP EDT is to be used may be indicated by the base station using a paging message or an RAR, or may be selected by the UE in consideration of whether the UE is currently in an inactive mode. The UP EDT may be triggered at least when the UE is in an inactive mode. If the UE receives a release message including suspend configuration information, the UE is switched from a connected mode to an inactive mode, and the suspend configuration information may include AS security information.

The base station may transmit msg4 including user data to the UE in response to the msg3 transmitted from the UE in operation 2c-40. In this instance, there may be the CP EDT method and the UP EDT method.

In the case of the CP EDT, a predetermined RRC message may be accommodated in the msg4. The RRC message may be an RRCEarlyDataComplete message. The RRC message may accommodate a NAS container including the user data.

In the case of the UP EDT, a predetermined RRC message may be accommodated in the msg4. The RRC message may be, for example, an RRCConnectionRelease message. In the RRC message, resumeID, resumeID, and NCC may be accommodated. The user data may be included in a DTCH that is multiplexed with the RRC message.

Figure 2D:
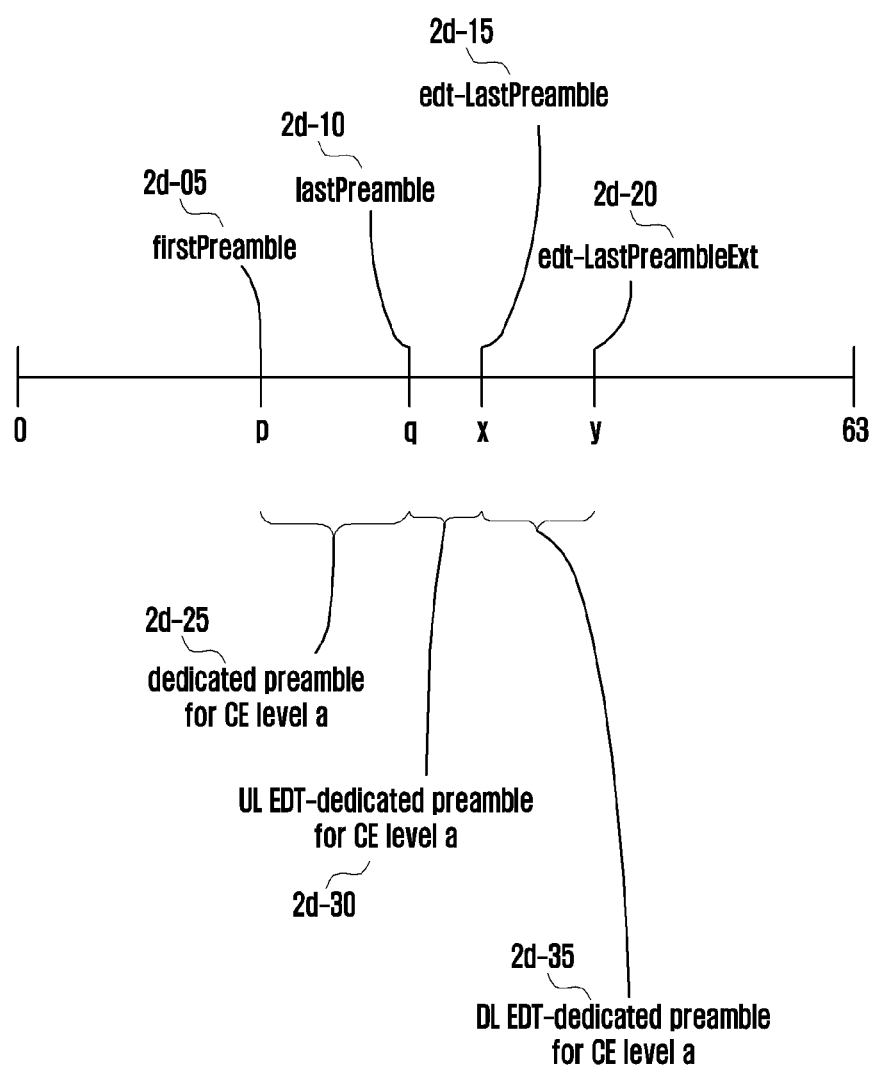
FIG. 2D is a conceptual diagram illustrating a method of indicating an MT-initiated EDT dedicated preamble according to the disclosure.

FIG. 2D is a conceptual diagram illustrating a method of indicating an MT-initiated EDT dedicated preamble according to the disclosure.

A base station may indicate an MT-initiated EDT dedicated preamble via system information. There may be a total of 64 preambles, and each preamble corresponds to one of IDs in the range of 0 to 63. A dedicated preamble may be allocated for each coverage extension (CE) level of MTC in operation 2d-25, and may be indicated by a field value. The field may be a firstPreamble field 2d-05 and a lastPreamble field 2d-10. In addition, a MO-initiated EDT dedicate preamble may be allocated for each coverage extension (CE) level of MTC, and may be indicated by a field value. The field may be an edt-LastPreamble field 1d-15. The MO-initiated EDT dedicated preamble may correspond to preambles 2d-30 from a preamble (preamble+1) after a preamble indicated by the lastPreamble field to a preamble indicated by the edt-LastPreamble field.

If a separate dedicated preamble for MT-initiated EDT is provided, an edt-LastPreambleExt field 2d-20 may be used. The MT-initiated EDT dedicated preamble may correspond to preambles 2d-35 from a preamble (preamble+1) after the preamble indicated by the edt-LastPreamble field to a preamble indicated by the edt-LastPreambleExt field.

If a preamble is for EDT and is used irrespective of whether it is for MO-initiated EDT or MT-initiated EDT, the edt-LastPreamble field is sufficient. In this instance, the preambles indicated by the edt-LastPreamble may be used for MO-initiated EDT or MT-initiated EDT.

Figure 2E:
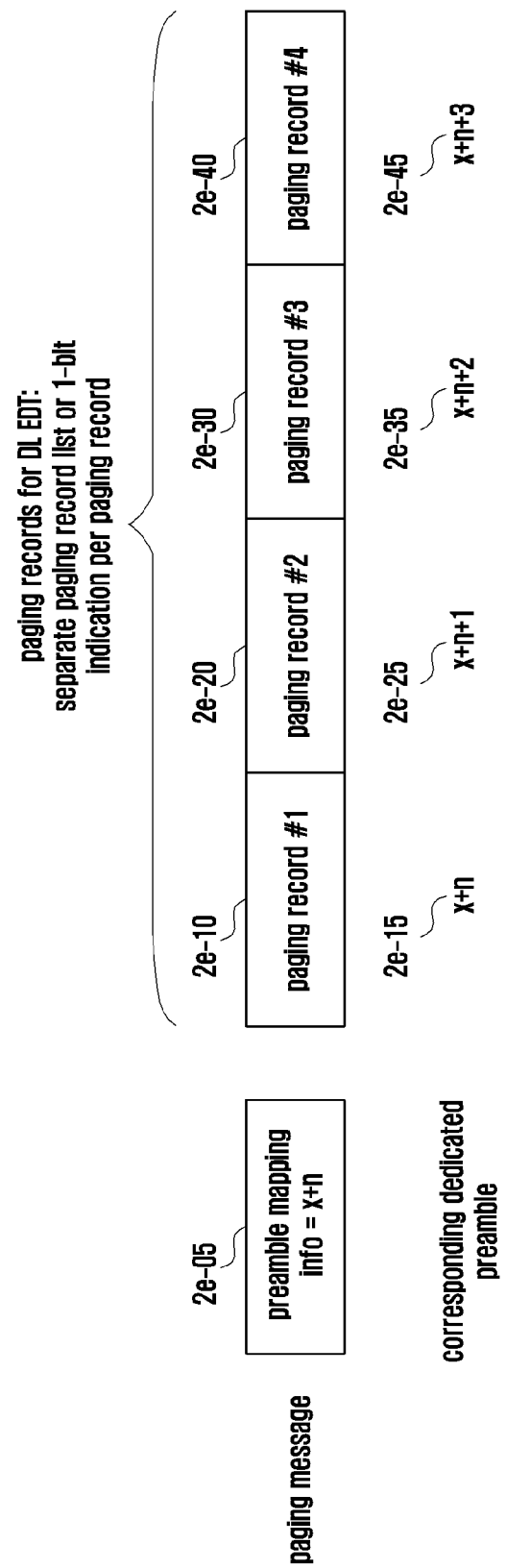
FIG. 2E is a conceptual diagram illustrating a method of configuring a paging message according to the disclosure.

FIG. 2E is a conceptual diagram illustrating a method of configuring a paging message according to the disclosure.

The size of information capable of being accommodated in a paging message may be limited. In the above-described embodiment, there has been provided a method of including a piece of dedicated preamble information for each of the paging records 2e-10, 2e-20, 2e-30, and 2e-40 related to DL EDT in the corresponding paging record. Since the total number of preambles is 64, 6 bits may be needed to indicate one of them. In order to include many paging records related to DL EDT in a single paging message, the preamble information needs to be optimized. In the disclosure, if multiple paging records related to DL EDT are accommodated in a single paging message, only a preamble ID 2e-05 corresponding to a first paging record related to DL EDT in the order of accommodation is included in the paging message. Preambles corresponding to the remaining paging records related to DL EDT may be applied by increasing the ID of the preamble corresponding to the first paging record related to DL EDT by 1 for each time. For example, if the ID 2e-05 of the preamble corresponding to the first paging record is x+n, the ID 2e-15 of a preamble corresponding to a paging record subsequent thereto is x+n+1, and the ID 2e-25 of a preamble corresponding to a paging record subsequent thereto is x+n+2.

In addition, in a paging record related to DL EDT, an indicator indicating the same may be included. The indicator may be one bit. As another example, the list of paging records related to DL EDT may be included in a paging message, separately from an existing list of paging records. For example, if an existing paging record list (PagingRecordList IE) is present, a separate paging record list (PagingRecordListExt IE) may be defined as shown in the case of ASN.1 code below.

```
-- ASN1START
Paging ::=                      SEQUENCE {
    pagingRecordList            PagingRecordList            OPTIONAL, -- Need ON
    systemInfoModification      ENUMERATED {true}           OPTIONAL, -- Need ON
    etws-Indication             ENUMERATED {true}           OPTIONAL, -- Need ON
    nonCriticalExtension        Paging-v890-IEs             OPTIONAL
}
PagingRecrdList ::=             SEQUENCE (SIZE (1..maxPageRec)) OF PagingRecord
PagingRecordListExt ::=         SEQUENCE (SIZE (1..maxPageRec)) OF PagingRecordExt
```

As mentioned above, if a separate paging record list that includes only paging records related to DL EDT is defined in the paging message, a separate indicator indicating the same may not be needed.

Figure 2F:
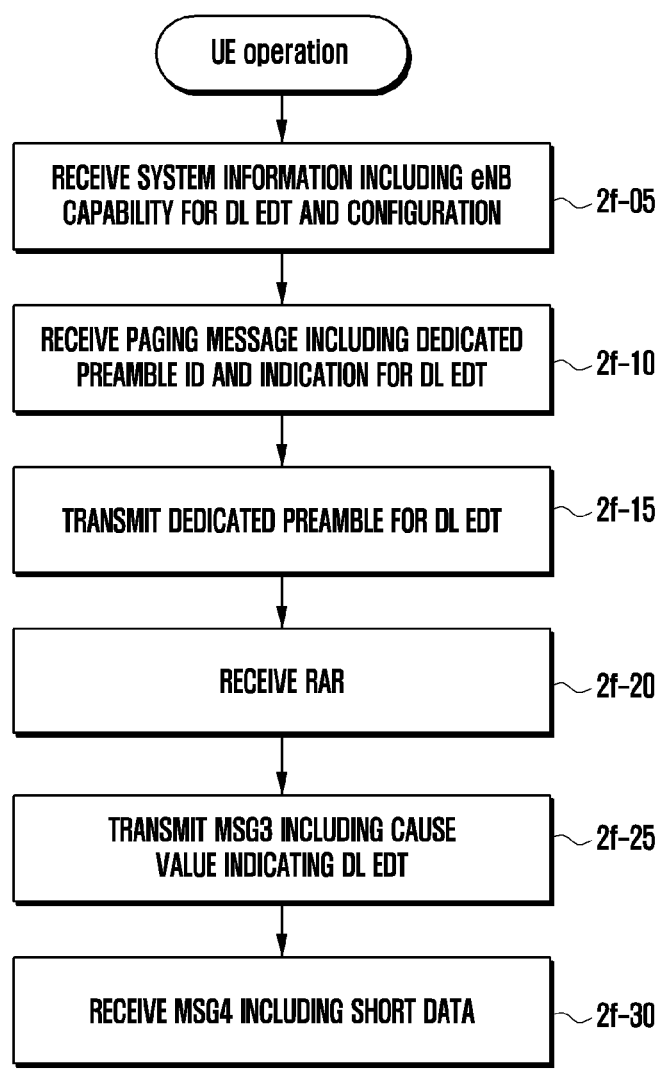
FIG. 2F is a flowchart illustrating operation of a UE according to the disclosure.

FIG. 2F is a flowchart illustrating operation of a UE according to the disclosure.

In operation 2f-05, a UE may identify whether a base station supports EDT based on system information broadcasted by the base station. Particularly, information indicating whether DL EDT is supported or whether DL EDT using msg4 is supported may be configured in the system information. In addition, dedicated preamble information used for msg4-based DL EDT may be provided via the system information.

In operation 2f-10, the UE may receive a paging message from the base station. The paging message for transmitting user data using msg4 may be an indicator indicating that msg4-based DL EDT is triggered or dedicated preamble information that the UE needs to use for performing random access for DL EDT.

In operation 2f-15, the UE may transmit a corresponding preamble to the base station using the dedicated preamble ID indicated.

In operation 2f-20, the UE may receive an RAR from the base station.

In operation 2f-25, the UE may transmit msg3 including a cause value indicating access for DL EDT. An RRC message transmitted via the msg3 may differ depending on CP EDT or UP EDT. In the case of the CP EDT, RRCEarlyDataRequest may be transmitted. In addition, in the case of the UP EDT, an RRCConnectionResumeRequest message may be transmitted.

In operation 2f-30, the UE may receive msg4 including user data from the base station. An RRC message transmitted via the msg4 may differ depending on CP EDT or UP EDT. In the case of the CP EDT, RRCEarlyDataComplete may be received. In addition, in the case of the UP EDT, an RRCConnectionRelease message may be received. If data needs to be transmitted in association with the msg4, an establishment process or MO-initiated EDT may be triggered.

Figure 2G:
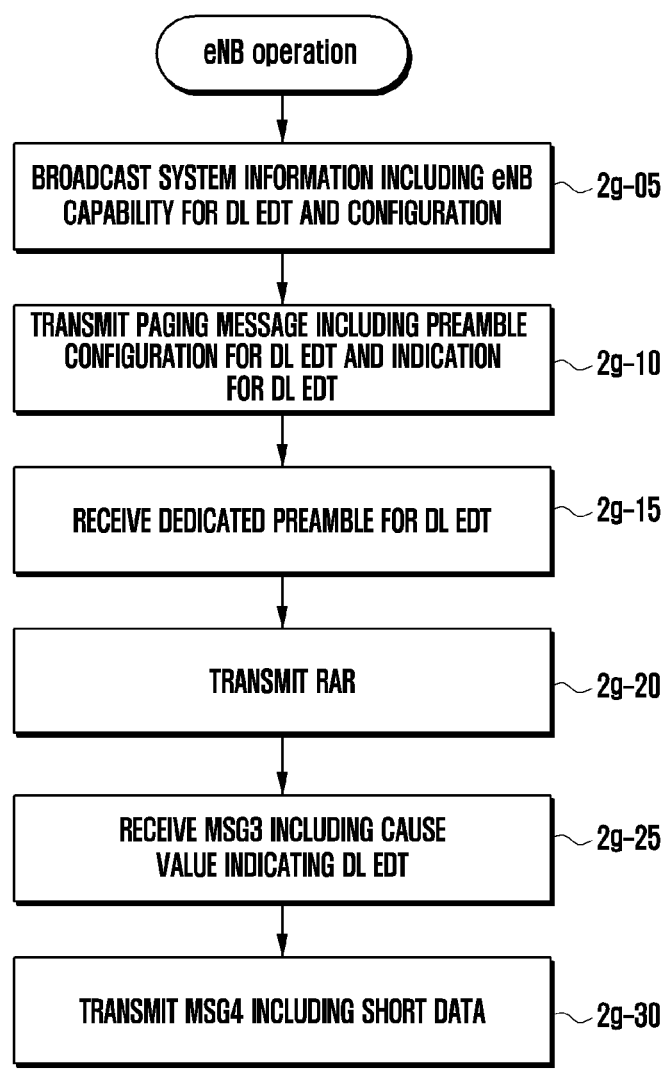
FIG. 2G is a flowchart illustrating operation of a base station according to the disclosure.

FIG. 2G is a flowchart illustrating operation of a base station according to the disclosure.

In operation 2g-05, a base station may broadcast system information. If the base station supports DL EDT, whether DL EDT is supported or DL EDT using msg4 is supported may be configured in the system information. In addition, dedicated preamble information used for msg4-based DL EDT may be included in the system information.

In operation 2g-10, the base station may transmit a paging message to the UE. The paging message may include an indicator indicating that msg4-based DL EDT is triggered or dedicated preamble information that the UE needs to use for random access for the DL EDT, in association with the paging record of a predetermined UE.

In operation 2g-15, the base station may transmit a corresponding preamble using the indicated dedicated preamble ID from the UE.

In operation 2g-20, the base station may transmit an RAR to the UE.

In operation 2g-25, the base station may receive an msg3 message from the UE.

In operation 2g-30, the base station may include user data for the UE in the msg4, and may transmit the same to the UE.

As another example, the base station may include user data for the UE in an RAR, and may transmit the same. In this instance, the user data may be accommodated in an NAS container, and the NAS container may be included in a predetermined RRC message. To transmit the user data via the RAR, the base station needs to indicate whether user data is transmitted via the RAR using a field in the paging message or bit information of an RAR MAC PDU.

The base station selects a message in which the user data is to be accommodated among a paging message, an RAR, and an msg4, depending on the size of user data, and may proceed with a corresponding EDT process.

Figure 2H:
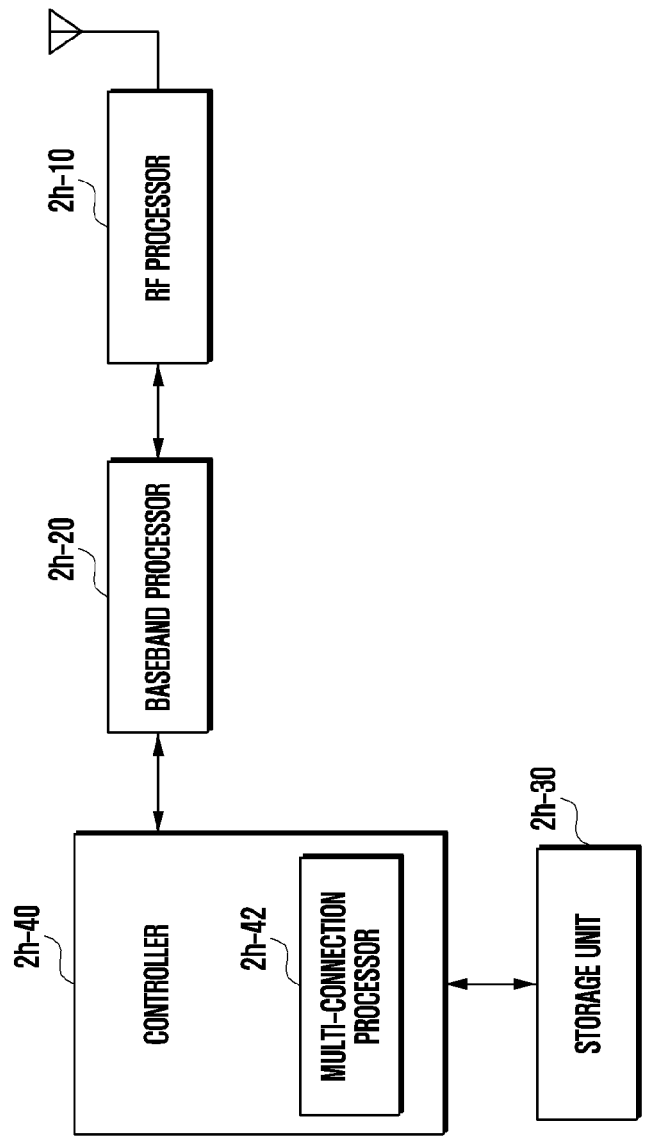
FIG. 2H is a block diagram illustrating the internal structure of a UE to which the disclosure is applied.

FIG. 2H illustrates the structure of a UE.

Referring to the drawing, the UE includes a radio frequency (RF) processor 2h-10, a baseband processor 2h-20, a storage unit 2h-30, and a controller 2h-40.

The RF processor 2h-10 performs a function for transmitting or receiving a signal via a wireless channel, such as band conversion and amplification of a signal. That is, the RF processor 2h-10 up-converts a baseband signal provided from the baseband processor 2h-20 into an RF band signal, transmits the RF band signal via an antenna, and down-converts an RF band signal received via the antenna into a baseband signal. For example, the RF processor 2h-10 may include a transmission filter, a reception filter, an amplifier, a mixer, an oscillator, a digital-to-analog converter (DAC), an analog-to-digital converter (ADC), and the like. Although only a single antenna is illustrated in the drawing, the UE may include a plurality of antennas. In addition, the RF processor 2h-10 may include a plurality of RF chains. Moreover, the RF processor 2h-10 may perform beamforming. For the beamforming, the RF processor 2h-10 may control the phase and the size of each of the signals transmitted or received via a plurality of antennas or antenna elements. In addition, the RF processor may perform MIMO, and may receive multiple layers when performing a MIMO operation.

The baseband processor 2h-20 may execute a function of conversion between a baseband signal and a bitstream, according to the physical layer standard of a system. For example, in the case of data transmission, the baseband processor 2h-20 may encode and modulate a transmission bitstream, so as to produce complex symbols. In addition, in the case of data reception, the baseband processor 2h-20 may restore a reception bitstream by demodulating and decoding a baseband signal provided from the RF processor 2h-10. For example, according to an orthogonal frequency division multiplexing (OFDM) scheme, in the case of data transmission, the baseband processor 2h-20 produces complex symbols by encoding and modulating a transmission bitstream, maps the complex symbols to subcarriers, and then configures OFDM symbols via an inverse fast Fourier transform (IFFT) operation and cyclic prefix (CP) insertion. Further, in the case of data reception, the baseband processor 2h-20 may divide a baseband signal provided from the RF processor 2h-10 in units of OFDM symbols, may reconstruct the signals mapped to the subcarriers via a fast Fourier transform (FFT) operation, and then may reconstruct a reception bitstream via demodulation and decoding.

The baseband processor 2h-20 and the RF processor 2h-10 may transmit or receive signals as described above. Accordingly, the baseband processor 2h-20 and the RF processor 2h-10 may be referred to as a transmitter, a receiver, a transceiver, or a communication unit. Furthermore, at least one of the baseband processor 2h-20 and the RF processor 2h-10 may include a plurality of communication modules in order to support different multiple radio access technologies. In addition, at least one of the baseband processor 2h-20 and the RF processor 2h-10 may include different communication modules to process signals of different frequency bands. For example, the different radio access technologies may include a wireless LAN (e.g., IEEE 802.11), a cellular network (e.g., LTE), and the like. Further, the different frequency bands may include a super high frequency (SHF) (e.g., 2.NRHz, NRhz) band and a millimeter (mm) wave (e.g., 60 GHz) band.

The storage unit 2h-30 may store data such as a basic program, an application program, and configuration information for operation of the UE. Particularly, the storage unit 2h-30 may store information related to a second access node that performs wireless communication using a second radio access technology. In addition, the storage unit 2h-30 provides data stored therein at the request of the controller 2h-40.

The controller 2h-40 controls overall operation of the UE. For example, the controller 2h-40 may perform transmission or reception of a signal via the baseband processor 2h-20 and the RF processor 2h-10. In addition, the controller 2h-40 may record data in the storage unit 2h-40 and may read the data. To this end, the controller 2h-40 may include at least one processor. For example, the controller 2h-40 may include a communication processor (CP) that performs control for communication, and an application processor (AP) that controls a higher layer such as an application program.

Figure 2I:
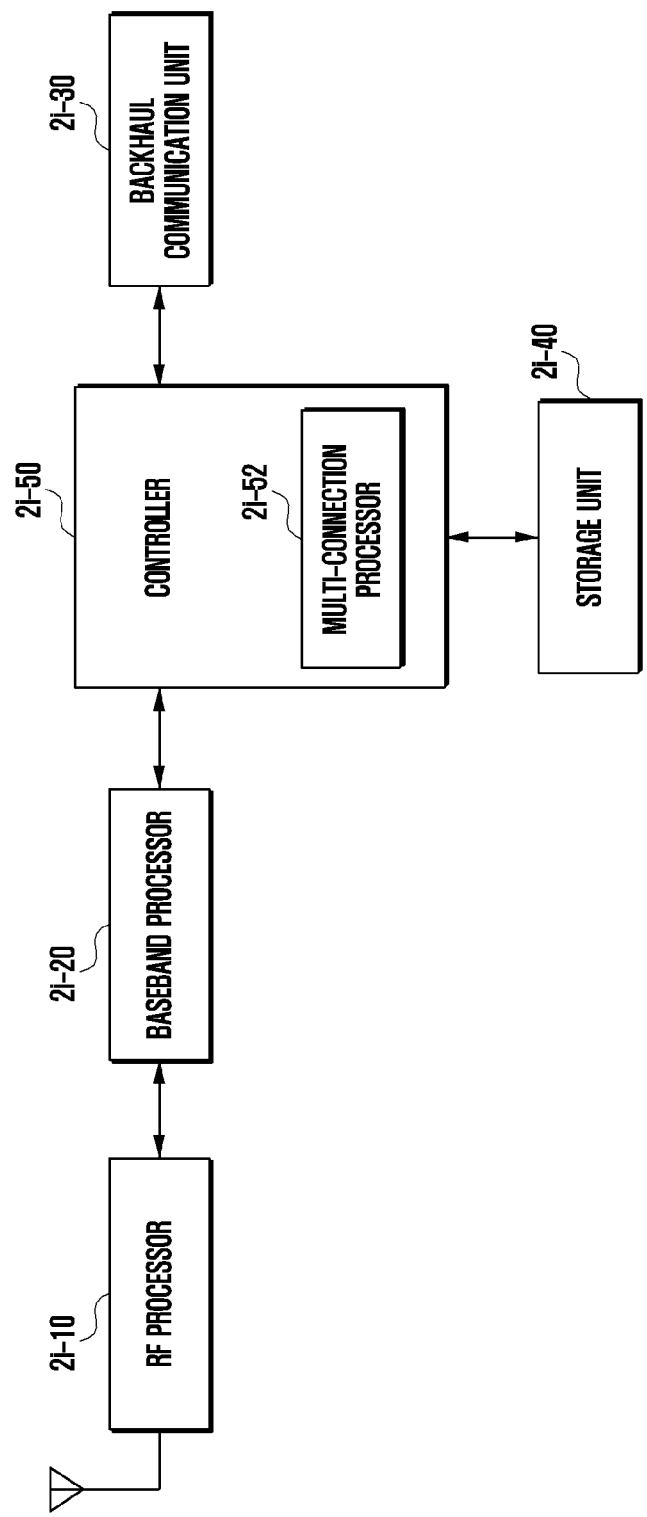
FIG. 2I is a block diagram illustrating the configuration of a base station according to the disclosure.

FIG. 2I is a block diagram of a master base station in a wireless communication system according to an embodiment of the disclosure.

As illustrated in the drawing, the base station may include an RF processor 2i-10, a baseband processor 2i-20, a backhaul communication unit 2i-30, a storage unit 2i-40, and a controller 2i-50.

The RF processor 2i-10 performs a function for transmitting or receiving a signal via a wireless channel, such as band conversion and amplification of a signal. That is, the RF processor 2i-10 up-converts a baseband signal provided from the baseband processor 2i-20 into an RF band signal, transmits the RF band signal via an antenna, and down-converts an RF band signal received via the antenna into a baseband signal. For example, the RF processor 2i-10 may include a transmission filter, a reception filter, an amplifier, a mixer, an oscillator, a DAC, an ADC, and the like. Although only a single antenna is illustrated in the drawing, first access node may include a plurality of antennas. In addition, the RF processor 2i-10 may include a plurality of RF chains. Moreover, the RF processor 2i-10 may perform beamforming. For the beamforming, the RF processor 2i-10 may control the phase and the size of each of the signals transmitted or received via a plurality of antennas or antenna elements. The RF processor may perform a downlink MIMO operation by transmitting one or more layers.

The baseband processor 2i-20 may perform a function of conversion between a baseband signal and a bitstream according to the physical layer standard of a first radio access technology. For example, in the case of data transmission, the baseband processor 2i-20 may encode and modulate a transmission bitstream, so as to produce complex symbols. In addition, in the case of data reception, the baseband processor 2i-20 may restore a reception bitstream by demodulating and decoding a baseband signal provided from the RF processor 2i-10. For example, according to the OFDM scheme, in the case of data transmission, the baseband processor 2i-20 may produce complex symbols by encoding and modulating a transmission bitstream, may map the complex symbols to subcarriers, and then may configure OFDM symbols via an IFFT operation and CP insertion.

Further, in the case of data reception, the baseband processor 2i-20 may divide a baseband signal provided from the RF processor 2i-10 in units of OFDM symbols, may reconstruct the signals mapped to the subcarriers via a fast Fourier transform (FFT) operation, and then may reconstruct a reception bitstream via demodulation and decoding. The baseband processor 2i-20 and the RF processor 2i-10 may transmit or receive signals as described above. Accordingly, the baseband processor 2i-20 and the RF processor 2i-10 may be referred to as a transmitter, a receiver, a transceiver, a communication unit, or a wireless communication unit.

The backhaul communication unit 2i-30 may provide an interface for performing the communication with other nodes in a network. That is, the backhaul communication unit 2i-30 may convert, into a physical signal, a bitstream transmitted from the master base station to another node, for example, a secondary base station, a core network, and the like, and may convert a physical signal received from the other node into a bitstream.

The storage unit 2i-40 may store data such as a basic program, an application program, and configuration information for operation of the master base station. Particularly, the storage unit 2i-40 may store information associated with a bearer allocated to a connected UE, a measurement result reported from a connected UE, and the like. In addition, the storage unit 2i-40 may store information which is a criterion for determining whether to provide or suspend multiple connections to a UE. In addition, the storage unit 2i-40 may provide data stored therein at the request of the controller 2i-50.

The controller 2i-50 may control overall operation of the master base station. For example, the controller 2i-50 may transmit or receive a signal via the baseband processor 2i-20 and the RF processor 2i-10, or via the backhaul communication unit 2i-30. In addition, the controller 2i-50 may record data in the storage unit 2i-40 and may read the data. To this end, the controller 2i-50 may include at least one processor.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a user equipment (UE) in a wireless communication system, the method comprising:
   receiving, from a base station, system information including information indicating whether a mobile terminated (MT) - early data transmission (MT-EDT) is supported at the base station;
   identifying whether the base station supports the MT-EDT based on the system information;
   receiving, from a base station, a paging message including information indicating the MT-EDT based on the identification, wherein the information has 1 bit information;
   selecting, a random access preamble, wherein the random access preamble is not configured for early data transmission (EDT);
   transmitting, to the base station, the random access preamble based on the paging message;
   receiving, from the base station, a random access response (RAR) based on the random access preamble; and
   transmitting, to the base station, an RRCConnectionResumeRequest message including a resume cause indicating the MT-EDT based on the RAR.

2. The method as claimed in claim 1, further comprising:
   receiving, from the base station, an RRCConnectionRelease message associated with downlink data based on the RRCConnectionResumeRequest message, and
   wherein the downlink data are transmitted on a dedicated traffic channel (DTCH) multiplexed with the RRCConnectionRelease message.

3. A method performed by a base station in a wireless communication system, the method comprising:
   broadcasting system information including information indicating whether a mobile terminated (MT)-early data transmission (MT-EDT) is supported at the base station;
   transmitting, to a user equipment (UE), a paging message including information indicating the MT-EDT, wherein the information has 1 bit information;
   receiving, from the UE, a random access preamble based on the paging message;
   transmitting, to the UE, a random access response (RAR) based on the random access preamble; and
   receiving, from the UE, an RRCConnectionResumeRequest message including a resume cause indicating the MT-EDT based on the RAR,
   wherein the random access preamble is selected, and
   wherein the random access preamble is not configured for the MT early data transmission (EDT).

4. The method as claimed in claim 3, further comprising:
   transmitting, to the UE, an RRCConnectionRelease message associated with downlink data based on the RRCConnectionResumeRequest message, and
   wherein the downlink data are transmitted on a dedicated traffic channel (DTCH) multiplexed with the RRCConnectionRelease message.

5. A user equipment (UE) comprising:
   a transceiver configured to transmit or receive at least one signal; and
   a controller coupled to the transceiver,
   wherein the controller is configured to:
      receive, from a base station, system information including information indicating whether a mobile terminated (MT)-early data transmission (MT-EDT) is supported at the base station,
      identify whether the base station supports the MT-EDT based on the system information,
      receive, from the base station, a paging message including information indicating the MT-EDT based on the identification, wherein the information has 1 bit information,
      select, a random access preamble, wherein the random access preamble is not configured for the MT early data transmission (EDT),
      transmit, to the base station, the random access preamble based on the paging message,
      receive, from the base station, a random access response (RAR) based on the random access preamble, and
   transmit, to the base station, an RRCConnectionResumeRequest message including a resume cause indicating the MT-EDT based on the RAR.

6. The UE as claimed in claim 5,
   wherein the controller is further configured to receive, from the base station, an RRCConnectionRelease message associated with downlink data based on the RRCConnectionResumeRequest message, and
   wherein the downlink data are transmitted on a dedicated traffic channel (DTCH) multiplexed with the RRCConnectionRelease message.

7. A base station comprising:
   a transceiver configured to transmit or receive at least one signal; and
   a controller coupled to the transceiver,
   wherein the controller is configured to:
      broadcast system information including information indicating whether a mobile terminated (MT)-early data transmission (MT-EDT) is supported at the base station,
      transmit, to a user equipment (UE), a paging message including information indicating the MT-EDT,
      receive, from the UE, a random access preamble based on the paging message, wherein the information has 1 bit information,
      transmit, to the UE, a random access response (RAR) based on the random access preamble, and
      receive, from the UE, an RRCConnectionResumeRequest message including a resume cause indicating the MT-EDT based on the RAR,
      wherein the random access preamble is selected, and
      wherein the random access preamble is not configured for the MT early data transmission (EDT).

8. The base station as claimed in claim 7,
   wherein the controller is further configured to transmit, to the UE, an RRCConnectionRelease message associated with downlink data based on the RRCConnectionResumeRequest message, and
   wherein the downlink data are transmitted on a dedicated traffic channel (DTCH) multiplexed with the RRCConnectionRelease message.

* * * * *